(12) United States Patent
Lee et al.

(10) Patent No.: US 9,637,630 B2
(45) Date of Patent: May 2, 2017

(54) RESIN COMPOSITION AND MOULDED ARTICLE USING SAME

(71) Applicant: Cheil Industries Inc., Gumi-si (KR)

(72) Inventors: Seon-Ae Lee, Uiwang-si (KR); Young-Sin Kim, Uiwang-si (KR); Min-Young Lim, Uiwang-si (KR); Kang-Yeol Park, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/769,267

(22) PCT Filed: Sep. 2, 2013

(86) PCT No.: PCT/KR2013/007904
§ 371 (c)(1),
(2) Date: Aug. 20, 2015

(87) PCT Pub. No.: WO2014/129712
PCT Pub. Date: Aug. 28, 2014

(65) Prior Publication Data
US 2015/0376396 A1    Dec. 31, 2015

(30) Foreign Application Priority Data
Feb. 21, 2013   (KR) .................. 10-2013-0018734

(51) Int. Cl.
*C08L 55/02* (2006.01)
*C08K 3/08* (2006.01)
*C08K 9/00* (2006.01)
*C08J 7/04* (2006.01)
*C08L 101/00* (2006.01)
*C08K 9/02* (2006.01)

(52) U.S. Cl.
CPC .............. *C08L 55/02* (2013.01); *C08J 7/042* (2013.01); *C08K 3/08* (2013.01); *C08K 9/02* (2013.01); *C08L 101/00* (2013.01); *C08J 2325/06* (2013.01); *C08J 2400/24* (2013.01); *C08L 2205/025* (2013.01); *C08L 2205/03* (2013.01); *C08L 2207/04* (2013.01)

(58) Field of Classification Search
CPC .. C09D 161/28; C09D 163/00; C09D 167/06; C09D 175/04; C09D 183/04; C08K 3/08; C08K 9/10; C08K 2003/0812; C08J 7/042
See application file for complete search history.

(56) References Cited

U.S. PATENT DOCUMENTS

| 3,549,405 A | 12/1970 | Schrenk et al. |
| 3,764,067 A | 10/1973 | Coffey et al. |
| 3,932,348 A | 1/1976 | Camelon et al. |
| 4,544,600 A | 10/1985 | Kern |
| 4,621,112 A | 11/1986 | Backhouse et al. |
| 4,892,779 A | 1/1990 | Leatherman et al. |
| 5,010,112 A | 4/1991 | Glicksman et al. |
| 5,332,767 A | 7/1994 | Reisser et al. |
| 5,334,657 A | 8/1994 | Swartzmiller et al. |
| 6,428,875 B1 | 8/2002 | Takahashi et al. |
| 6,933,044 B2 | 8/2005 | Ishikawa |
| 7,052,769 B2 | 5/2006 | Hase et al. |
| 7,485,365 B2 | 2/2009 | Schuster et al. |
| 7,553,887 B2 | 6/2009 | Sugimoto et al. |
| 7,820,279 B2 | 10/2010 | Hiraoka et al. |
| 7,923,099 B2 | 4/2011 | Park |
| 8,007,902 B2 | 8/2011 | Smith |
| 8,642,681 B2 | 2/2014 | Setoguchi |
| 8,946,337 B2 | 2/2015 | Lee et al. |
| 2002/0013398 A1 | 1/2002 | Ido et al. |
| 2005/0104214 A1 | 5/2005 | Maeda et al. |
| 2006/0017193 A1 | 1/2006 | Asthana et al. |
| 2006/0046057 A1 | 3/2006 | Huber et al. |
| 2006/0105663 A1 | 5/2006 | Greulich et al. |
| 2006/0167147 A1 | 7/2006 | Asgari |
| 2007/0276083 A1 | 11/2007 | Higashi et al. |
| 2008/0281029 A1 | 11/2008 | Morvan et al. |
| 2012/0065298 A1 | 3/2012 | Setoguchi |
| 2012/0129992 A1 | 5/2012 | Kang et al. |
| 2012/0264869 A1 | 10/2012 | Lee et al. |
| 2012/0270988 A1 | 10/2012 | Lee et al. |

(Continued)

FOREIGN PATENT DOCUMENTS

| CN | 1541830 | 11/2001 |
| CN | 1427910 A | 5/2003 |
| CN | 1764698 A | 7/2003 |

(Continued)

OTHER PUBLICATIONS

International Search Report and Written Opinion in counterpart International Application No. PCT/KR2013/007904 dated Nov. 26, 2013, pp. 1-7.
Extended European Search Report in commonly owned European Application No. 13183216.4 dated Mar. 28, 2014, pp. 1-6.
Search Report in commonly owned Chinese Application No. 2013104044803 dated Mar. 26, 2015, pp. 1-3.
Search Report in commonly owned Chinese Application No. 2013104036417 dated Mar. 8, 2015, pp. 1-2.
European Search Report in commonly owned European Application No. 13183218.0 dated Nov. 26, 2013, pp. 1-5.
Office Action in commonly owned U.S. Appl. No. 13/872,250 mailed Nov. 4, 2014, pp. 1-16.
Final Office Action in commonly owned U.S. Appl. No. 13/872,250 mailed Apr. 3, 2015, pp. 1-21.
Office Action in commonly owned U.S. Appl. No. 13/872,250 mailed Dec. 3, 2015, pp. 1-22.
Final Office Action in commonly owned U.S. Appl. No. 13/872,250 mailed May 3, 2016, pp. 1-21.
Office Action in commonly owned U.S. Appl. No. 13/872,260 mailed Sep. 10, 2014, pp. 1-11.
Final Office Action in commonly owned U.S. Appl. No. 13/872,260 mailed Apr. 22, 2015, pp. 1-7.

(Continued)

*Primary Examiner* — Fred M Teskin
(74) *Attorney, Agent, or Firm* — Additon, Higgins & Pendleton, P.A.

(57) ABSTRACT

A resin composition includes (A) a thermoplastic resin, (B) a first metal layer-resin composite particle including a first metal layer and first thermosetting resin coating layers positioned on the first metal layer and (C) a second metal layer-resin composite particle including a second metal layer and second thermosetting resin coating layers positioned on the second metal layer, and a molded article using the same.

16 Claims, 4 Drawing Sheets

(56) References Cited

U.S. PATENT DOCUMENTS

| | | |
|---|---|---|
| 2014/0066563 A1 | 3/2014 | Kim et al. |
| 2014/0072795 A1 | 3/2014 | Kim et al. |

FOREIGN PATENT DOCUMENTS

| | | |
|---|---|---|
| CN | 1495227 | 5/2004 |
| CN | 101796110 A | 8/2010 |
| EP | 0801335 A1 | 10/1997 |
| EP | 1721939 A1 | 11/2006 |
| EP | 1306483 A1 | 3/2009 |
| JP | 06-285948 | 10/1991 |
| JP | 07-118561 A | 5/1995 |
| JP | 07-156299 A | 6/1995 |
| JP | 09-165487 A | 6/1997 |
| JP | 10-000735 | 1/1998 |
| JP | 10-017674 A | 1/1998 |
| JP | 10-182873 A | 7/1998 |
| JP | 11-010791 | 1/1999 |
| JP | 2001-181515 A | 7/2001 |
| JP | 2001-262003 A | 9/2001 |
| JP | 2002-127328 | 5/2002 |
| JP | 2003-019777 | 1/2003 |
| JP | 2003-103733 | 4/2003 |
| JP | 2004-066500 A | 3/2004 |
| JP | 2004-083608 A | 3/2004 |
| JP | 2004-346194 A | 12/2004 |
| JP | 2005-123735 | 5/2005 |
| JP | 2007-118350 A | 5/2007 |
| JP | 2007-137963 A | 6/2007 |
| JP | 2007-190702 A | 8/2007 |
| JP | 2007-326314 A | 12/2007 |
| JP | 2009-035713 A | 2/2009 |
| JP | 2009-046679 A | 3/2009 |
| JP | 2010-201669 | 9/2010 |
| JP | 2011-026537 A | 2/2011 |
| JP | 2011-094056 | 5/2011 |
| JP | 2011-143584 | 7/2011 |
| JP | 2011-183577 A | 9/2011 |
| KR | 10-0227586 | 1/1999 |
| KR | 10-2001-0033813 A | 4/2001 |
| KR | 10-2003-0035897 A | 5/2003 |
| KR | 10-2006-0031692 A | 4/2006 |
| KR | 10-2006-0106623 A | 10/2006 |
| KR | 10-0690898 B1 | 2/2007 |
| KR | 10-2007-0102717 A | 10/2007 |
| KR | 10-2009-0066577 A | 6/2009 |
| KR | 10-2010-0079612 A | 7/2010 |
| KR | 10-2011-0008598 A | 1/2011 |
| KR | 10-2011-0057415 | 6/2011 |
| KR | 10-2011-0079465 A | 7/2011 |
| KR | 10-2011-0079466 A | 7/2011 |
| KR | 10-2011-0107034 A | 9/2011 |
| KR | 10-2012-0027280 | 3/2012 |
| KR | 10-2014-0032301 A | 3/2014 |
| TW | 200621902 | 7/2006 |
| WO | WO 2006/041658 A1 * | 4/2006 |
| WO | 2009/029095 A1 | 3/2009 |
| WO | 2014/065472 A1 | 5/2014 |
| WO | 2014/129712 A1 | 8/2014 |

OTHER PUBLICATIONS

Advisory Action in commonly owned U.S. Appl. No. 13/872,260 mailed Jul. 14, 2015, pp. 1-4.
Notice of Allowance in commonly owned U.S. Appl. No. 13/872,260 mailed Sep. 28, 2015, pp. 1-5.
Search Report in counterpart Chinese Application No. 201380073664.4 dated Jul. 26, 2016, pp. 1-2.
Search Report in commonly owned Chinese Application No. 201380067877.6 dated Jan. 6, 2016, pp. 1-2.
International Search Report and Written Opinion in commonly owned International Application No. PCT/KR2013/001291, dated Jun. 10, 2013, pp. 1-6.
Garcia et al., "New Fluorinated Polymers Doped with BODIPY Chromophore as Highly Efficient and Photostable Optical Materials," Chem. Mater. 18, 601-602 (2006).
Advisory Action in commonly owned U.S. Appl. No. 13/872,250 mailed Jul. 15, 2016, pp. 1-7.
Office Action in commonly owned U.S. Appl. No. 14/437,058 mailed Oct. 27, 2016, pp. 1-2.
Office Action in commonly owned U.S. Appl. No. 14/655,444 mailed Nov. 18, 2016, pp. 1-5.

* cited by examiner

RESIN COMPOSITION AND MOULDED ARTICLE USING SAME

CROSS-REFERENCE TO RELATED APPLICATIONS

This application claims priority to and the benefit of International Application No. PCT/KR2013/007904, filed Sep. 2, 2013, which published as WO 2014/129712 on Aug. 28, 2014, and Korean Patent Application No. 10-2013-0018734, filed in the Korean Intellectual Property Office on Feb. 21, 2013, the entire disclosure of each of which is incorporated herein by reference.

TECHNICAL FIELD

A resin composition and a molded article using the same are disclosed.

BACKGROUND ART

Recently, plastic exterior products with diverse colors have been winning popularity for electronic parts, automobile parts, and the like. In addition, the plastic exterior products are increasingly realizing high quality sense of touch.

The plastic exterior products usually include a plastic resin and a metal particle and thus, realize a resin appearance with a metal-like texture. This is disclosed in Japanese Patent Laid-Open Publication Nos. 2001-262003 and 2007-137963, but the metal-like texture did not appear in an actual experiment.

Japanese Patent Laid-Open Publication No. 2001-262003 discloses a use of a flake-shaped metal particulate, but a weld line occurs in an actual experiment. Japanese Patent Laid-Open Publication No. 2007-137963 discloses resin composition including a glass fiber and a metal particle, but appearance failure occurs due to the glass fiber in an actual experiment.

A conventional article formed by adding a metal particle to a plastic resin may realize only a metal-mixing texture, and has a difference from a painted article having a metal-like texture and is insufficient for replacing a painted article.

DISCLOSURE

Technical Problem

One embodiment of the present invention provides a resin composition and a molded article using the same having a metal-like texture near to that of a painted article while not being painted and excellent luminance with almost no flow mark or weld line and a method of manufacturing the molded article.

Technical Solution

In one embodiment of the present invention, a resin composition includes (A) a thermoplastic resin, (B) a first metal layer-resin composite particle including a first metal layer and first thermosetting resin coating layers positioned on the first metal layer, and (C) a second metal layer-resin composite particle including a second metal layer and second thermosetting resin coating layers positioned on the second metal layer.

A thickness of the first metal layer may be 0.01 µm to 1.0 µm, and a thickness of the second metal layer may be 1.0 µm to 60 µm.

The resin composition may include (B) 0.01 part by weight to 1 part by weight of the first metal layer-resin composite particle and (C) 0.005 parts by weight to 0.8 parts by weight of the second metal layer-resin composite particle based on 100 parts by weight of the thermoplastic resin (A).

The thermoplastic resin (A) may include a polycarbonate resin, a rubber modified vinyl-based copolymer resin, a polyester resin, a polyalkyl(meth)acrylate resin, a styrene-based polymer, a polyolefin resin, or a combination thereof.

The first metal layer may be an aluminum deposition layer.

The second metal layer-resin composite particle (C) may have a side cut by a laser.

The second metal layer-resin composite particle (C) may have D90/D10 in a range of 0.8 to 1.2.

The second metal layer-resin composite particle (C) may have a quadrangular film shape.

In the second metal layer-resin composite particle (C), the second metal layer may be an aluminum foil.

At least one of the first thermosetting resin coating layer and the second thermosetting resin coating layer may be a phenolic resin, an epoxy resin, an unsaturated polyester resin, an urethane resin, an urea resin, a melamine resin, an alkyd resin, a silicone resin, a vinylester resin, or a combination thereof.

At least one of the thermoplastic resin, the first thermosetting resin coating layer and the second thermosetting resin coating layer may have a refractive index of 1.45 to 1.55. For example, the refractive indexes of the thermoplastic resin, the first thermosetting resin coating layer and the second thermosetting resin coating layer may be 1.45 to 1.55.

At least one of the thermoplastic resin, the first thermosetting resin coating layer and the second thermosetting resin coating layer may be transparent or translucent. For example, the thermoplastic resin, the first thermosetting resin coating layer, and the second thermosetting resin coating layer may be all transparent or translucent.

In another embodiment of the present invention, a molded article using the resin composition is provided.

A flop index of the molded article may be 8 to 16.

A sparkle intensity of the molded article may be 10 to 18.

Luminance of the molded article measured with reference to a gloss level at an angle of about 60° may be 80 to 99.

Advantageous Effect

A resin composition and a molded article using the same according to one embodiment may realize a metal-like texture near to that of a painted molded article while not being painted, has excellent luminance, and has no flow mark or weld line.

MODE FOR INVENTION

Hereinafter, embodiments of the present invention are described in detail. However, these embodiments are only exemplary, and the present invention is not limited thereto.

As used herein, when specific definition is not otherwise provided, "(meth)acrylate" refers to both "acrylate" and "methacrylate". In addition, "(meth)acrylic acid alkyl ester" refers to "acrylic acid alkyl ester" and "methacrylic acid alkyl ester", and "(meth)acrylic acid ester" refers to "acrylic acid ester" and "methacrylic acid ester".

In the present specification, when a definition is not otherwise provided, "copolymerization" may refer to block copolymerization, random copolymerization, graft copolymerization or alternate copolymerization, and "copolymer" may refer to a block copolymer, a random copolymer, a graft copolymer or an alternate copolymer.

In the present specification, when specific definition is not otherwise provided, a particle size, a particle diameter, a major axis, a grain size, an equivalent diameter, and the like have the same meanings. Herein, a major axis refers the longest length of line connecting two points in a closed curve, and the closed curve is a curved line where a point moves in one direction and returns to the departure point.

In the present specification, when specific definition is not otherwise provided, a thickness refers to a longest length that is perpendicular to flat surface including a major axis and manor axis.

In one embodiment of the present invention, a resin composition includes (A) a thermoplastic resin, (B) a first metal layer-resin composite particle including a first metal layer and first thermosetting resin coating layers positioned on the first metal layer and (C) a second metal layer-resin composite particle including a second metal layer and second thermosetting resin coating layers positioned on the second metal layer.

A thickness of the first metal layer may be 0.01 μm to 1.0 μm, and a thickness of the second metal layer may be 1.0 μm to 60 μm.

A thickness of the first metal layer-resin composite particle (B) may be 1.0 μm to 10 μm, and a thickness of the second metal layer-resin composite particle (C) may be 10 μm to 90 μm.

The resin composition and the molded article using the same realize a metal-like texture near to that of a painted molded article while not being painted, has excellent luminance, and has no flow mark or weld line.

The resin composition may include (B) 0.01 part by weight to 1 part by weight of a first metal layer-resin composite particle and (C) 0.005 parts by weight to 0.8 parts by weight of a second metal layer-resin composite particle based on 100 parts by weight of the thermoplastic resin (A).

In this case, the resin composition and the molded article using the same realize a metal-like texture near to that of a painted molded article while not being painted, has excellent luminance, and has no flow mark or weld line.

(A) Thermoplastic Resin

The thermoplastic resin may include a polycarbonate resin, a rubber modified vinyl-based copolymer resin, a polyester resin, a polyalkyl(meth)acrylate resin, a styrene-based polymer, a polyolefin resin or a combination thereof.

A refractive index of the thermoplastic resin may be 1.45 to 1.55. When the thermoplastic resin has a refractive index within the range, a resin composition and a molded article using the same show an excellent metal-like texture and very excellent luminance. In particular, when the thermoplastic resin has a similar refractive index to those of the first thermosetting resin coating layer of the first metal layer-resin composite particle (B) and/or the second thermosetting resin coating layer of second metal layer-resin composite particle (C), the resin composition and the molded article using the same realize a metal-like texture near to that of a painted one without being painted and has excellent luminance but no flow mark or weld line problem.

The thermoplastic resin may be transparent or translucent. The 'transparent' indicates transmitting almost all incident light, and the 'translucent' indicates transmitting a part of the incident light.

In other words, the thermoplastic resin may have a haze in a range of 0.5 to 40%. The haze indicates a turbidity or cloudiness degree.

Specifically, the haze may be in a range of 0.5% to 40%, 0.5% to 35%, 0.5% to 30%, 0.5% to 25%, 0.5% to 20%, and 0.5% to 15%.

In the present invention, the haze may be calculated through the following Calculation Equation 1.

$$\text{Haze (\%)} = \{\text{diffused light}/(\text{diffused and transmitted light} + \text{parallel transmitted light})\} \times 100 \quad [\text{Calculation Equation 1}]$$

When the thermoplastic resin is transparent or translucent, that is, has a haze within the range, a resin composition including the first metal layer-resin composite particle (B) along with the thermoplastic resin and a molded article using the same show a metal-like texture near to that of a painted one without being painted and has excellent luminance.

The thermoplastic resin may be any well-known transparent or translucent resin. For example, as described above, the polycarbonate resin, the rubber modified vinyl-based copolymer resin, the polyester resin, polyalkyl(meth)acrylate resin, the styrene-based polymer, the polyolefin resin or combination thereof may be used.

The thermoplastic resin may provide the resin composition with basic properties such as impact resistance, heat resistance, flexural characteristics, tensile characteristics, and the like.

The polycarbonate resin may be prepared by reacting diphenols with a compound of a phosgene, halogen formate, carbonate ester, or a combination thereof.

Examples of the diphenols include hydroquinone, resorcinol, 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like. Of the diphenols, 2,2-bis(4-hydroxyphenyl)propane, 2,2-bis(3,5-dichloro-4-hydroxyphenyl)propane or 1,1-bis(4-hydroxyphenyl)cyclohexane may be preferably used, and 2,2-bis(4-hydroxyphenyl)propane may be more preferably used.

The polycarbonate resin may have a weight average molecular weight of 10,000 to 200,000 g/mol and specifically, 15,000 to 80,000 g/mol without limitation.

The polycarbonate resin may be a mixture of copolymers obtained using two or more dipenols that differ from each other. The polycarbonate resin may include a linear polycarbonate resin, a branched polycarbonate resin, a polyestercarbonate copolymer resin, and the like.

The linear polycarbonate resin may include a bisphenol-A-based polycarbonate resin. The branched polycarbonate resin may be produced by reacting a multi-functional aromatic compound such as trimellitic anhydride, trimellitic acid, and the like with diphenols and a carbonate. The multi-functional aromatic compound may be included in an amount of 0.05 to 2 mol % based on the total weight of the branched polycarbonate resin. The polyester carbonate copolymer resin may be produced by reacting difunctional carboxylic acid with diphenols and a carbonate. The carbonate may include diaryl carbonate such as diphenyl carbonate, ethylene carbonate, and the like.

The rubber modified vinyl-based copolymer resin may include 5 to 95 wt % of a vinyl-based polymer and 5 to 95 wt % of a rubbery polymer.

The rubbery polymer may include a butadiene rubber, an acrylic rubber, an ethylene/propylene rubber, a styrene/butadiene rubber, an acrylonitrile/butadiene rubber, an isoprene rubber, an ethylene-propylene-diene terpolymer (EPDM) rubber, a polyorganosiloxane/polyalkyl(meth)acrylate rubber composite, or a combination thereof.

The vinyl-based polymer may be a polymer of 50 to 95 wt % of a first vinyl-based monomer of an aromatic vinyl monomer, an acryl-based monomer, a heterocyclic monomer, or a combination thereof; and 5 to 50 wt % of a second vinyl-based monomer of an unsaturated nitrile monomer, an acryl-based monomer, a heterocyclic monomer, or a combination thereof.

The aromatic vinyl monomer may be styrene, C1 to C10 alkyl-substituted styrene, halogen-substituted styrene, or a combination thereof. The alkyl-substituted styrene may include o-ethyl styrene, m-ethyl styrene, p-ethyl styrene, α-methyl styrene, and the like.

The acryl-based monomer may include (meth)acrylic acid alkyl ester, (meth)acrylic acid ester, or a combination thereof. Herein, the alkyl may be a C1 to C10 alkyl. The (meth)acrylic acid alkyl ester may include methyl(meth)acrylate, ethyl(meth)acrylate, propyl(meth)acrylate, butyl(meth)acrylate, and the like, and among them, methyl(meth)acrylate may be preferable. Examples of the (meth)acrylic acid ester may be (meth)acrylate and the like.

The heterocyclic monomer may be maleic anhydride, an alkyl- or phenyl N-substituted maleimide, or a combination thereof.

The unsaturated nitrile monomer may include acrylonitrile, methacrylonitrile, ethacrylonitrile, or a combination thereof.

When the rubber modified vinyl-based graft copolymer resin is prepared, a rubber particle may have a particle diameter of 0.1 to 1 μm to improve the impact resistance and surface characteristics of a molded article, and when the particle diameter of the rubber particle ranges from 0.1 to 1 μm, excellent impact strength may be secured.

The rubber modified vinyl-based copolymer resin may be used singularly or as a mixture of two or more.

Specific examples of the rubber modified vinyl-based copolymer resin may include a styrene, acrylonitrile, and optionally methyl(meth)acrylate graft-copolymerized on a butadiene rubber, an acrylic rubber, or a styrene/butadiene rubber as a mixture.

Another example of the rubber modified vinyl-based copolymer resin may be a copolymer including methyl (meth)acrylate graft-copolymerized with a butadiene rubber, an acrylic rubber, or a styrene/butadiene rubber.

The method of preparing the rubber modified vinyl-based graft copolymer resin is widely known to those skilled in the art, and may be any one of emulsion polymerization, suspension polymerization, solution polymerization or massive polymerization.

The polyester resin is an aromatic polyester resin and may include a condensation-polymerized resin obtained from melt polymerization of terephthalic acid or alkylester terephthalate, and a C2 to C10 glycol component. Herein, the alkyl may be a C1 to C10 alkyl.

The aromatic polyester resin may include a polyethylene terephthalate resin, a polytrimethylene terephthalate resin, a polybutylene terephthalate resin, a polyhexamethylene terephthalate resin, a polycyclohexane dimethylene terephthalate resin, or a polyester resin modified into a non-crystalline resin by mixing the resins with another monomer, and among them a polyethylene terephthalate resin, a polytrimethylene terephthalate resin, a polybutylene terephthalate resin, and a non-crystalline polyethylene terephthalate resin may be preferably used, and a polybutylene terephthalate resin and a polyethylene terephthalate resin may be more preferably used.

The polyethylene terephthalate resin may be a condensation-polymerized polymer obtained through a direct ester reaction or an ester exchange reaction of an ethyleneglycol monomer and a terephthalic acid or dimethyl terephthalate monomer.

In addition, in order to increase the impact strength of the polybutylene terephthalate resin, the polybutylene terephthalate resin may be copolymerized with polytetramethyleneglycol (PTMG), polyethyleneglycol (PEG), polypropyleneglycol (PPG), a low molecular-weight aliphatic polyester, or aliphatic polyamide, it may be used in the form of a modified polybutylene terephthalate resin obtained by blending with a component improving an impact strength.

The polyalkyl(meth)acrylate resin may be obtained by polymerizing a monomer material including an alkyl(meth)acrylate through a known polymerization method, such as a suspension polymerization method, a massive polymerization method, an emulsion method and the like.

The alkyl(meth)acrylate may have a C1 to C10 alkyl group, and may include methyl(meth)acrylate, ethyl(meth)acrylate, butyl(meth)acrylate, glycidyl(meth)acrylate, hydroxyethyl(meth)acrylate, and the like.

The polyalkyl(meth)acrylate may have a weight average molecular weight of 10,000 to 200,000 g/mol, and specifically 15,000 to 150,000 g/mol. When the polyalkyl(meth)acrylate has a weight average molecular weight within the above range, hydrolysis resistance, scratch resistance, workability, and the like may be improved.

The styrene-based polymer may be a polymer including 20 to 100 wt % of a styrene-based monomer; and 0 to 80 wt % of a vinyl-based monomer selected from an acryl-based monomer, a heterocyclic monomer, an unsaturated nitrile monomer, or a combination thereof. The styrene-based polymer may be for example a rubber modified styrene-based polymer such as a rubber-reinforced polystyrene resin (HIPS).

The styrene-based monomer may be styrene, C1 to C10 alkyl-substituted styrene, halogen-substituted styrene, or a combination thereof. The alkyl-substituted styrene may include o-ethyl styrene, m-ethyl styrene, p-ethyl styrene, α-methyl styrene, and the like.

The acryl-based monomer may include (meth)acrylic acid alkyl ester, (meth)acrylic acid ester, or a combination thereof. Herein, the alkyl may be a C1 to C10 alkyl. The (meth)acrylic acid alkyl ester may include methyl(meth)acrylate, ethyl(meth)acrylate, propyl(meth)acrylate, butyl(meth)acrylate, and the like, and among them, methyl(meth)

acrylate may be preferable. Examples of the (meth)acrylic acid ester may be (meth)acrylate, and the like.

The heterocyclic monomer may be maleic anhydride, an alkyl- or phenyl N-substituted maleimide, or a combination thereof.

The unsaturated nitrile monomer may include acrylonitrile, methacrylonitrile, ethacrylonitrile, or a combination thereof.

The styrene-based polymer may be selected from a copolymer of a styrene-based monomer and an unsaturated nitrile monomer, a copolymer of a styrene-based monomer and an acryl-based monomer, a copolymer of a styrene-based monomer, an unsaturated nitrile monomer, and an acryl-based monomer, a styrene-based homopolymer of a styrene-based monomer, and a combination thereof.

The styrene-based polymer may have a weight average molecular weight of 40,000 to 500,000 g/mol.

The styrene-based polymer may be prepared using emulsion polymerization, suspension polymerization, solution polymerization, massive polymerization, and the like.

The polyolefin resin may be a polyethylene resin (PE), a polypropylene resin (PP) or a copolymer thereof.

The thermoplastic resin may be an alloy including two or more kinds of resins.

(B) First Metal Layer-Resin Composite Particle

The first metal layer-resin composite particle (B) includes a first metal layer and a first thermosetting resin coating layer both sides of the first metal layer.

Specifically, the first metal layer may be a metal deposition layer. Herein, the first metal layer-resin composite particle (B) includes the metal deposition layer having high flatness and may realize high luminance and an excellent metal-like texture.

The first metal layer may be, for example, formed by vacuum-depositing a metal such as aluminum, copper, gold, or a combination thereof. Particularly, an aluminum deposition layer may show an excellent metal-like texture, and the metal-like texture may be similar to silver gloss.

The first metal layer may have a thickness ranging from 0.01 to 1.0 μm and specifically 0.01 to 0.9 μm, 0.01 to 0.8 μm, 0.01 to 0.7 μm, 0.01 to 0.6 μm, 0.01 to 0.5 μm, 0.05 to 1.0 μm, 0.1 to 1.0 μm, 0.2 to 1.0 μm, 0.3 to 1.0 μm, or 0.4 to 1.0 μm. The first metal layer may be very thinner than conventional metal particles prepared by grinding a metal foil and the like.

When the first metal layer has the thickness ranges, the first metal layer-resin composite particle (B) including the first metal layer may have very excellent flatness. The molded article including the first metal layer-resin composite particle (B) realize a metal-like texture near to that of a painted one while not being painted, and has excellent luminance.

The first metal layer-resin composite particle (B) includes the first thermosetting resin coating layer and thus, may be uniformly dispersed inside a molded article.

When the first metal layer-resin composite particle (B) is melted/kneaded with the thermoplastic resin at a high process temperature, the first thermosetting resin coating layer may be neither fused nor separated and also, causes no chemical reaction with the thermoplastic resin. Accordingly, the first metal layer-resin composite particle (B) may not be modified at the high process temperature but maintain a shape and properties.

The first thermosetting resin coating layer may be, specifically a phenolic resin, an epoxy resin, unsaturated polyester resin, a urethane resin, a urea resin, a melamine resin, an alkyd resin, a silicone resin, a vinylester resin or a combination thereof.

The first thermosetting resin coating layer may further include an additive. The additive may be polyvinyl butyral (PVB). When the first thermosetting resin coating layer further includes the additive, adherence of the first metal layer to the first thermosetting resin coating layer, transparency of the first thermosetting resin coating layer and properties of the first metal layer-resin composite particle (B) such as luminance and the like may be improved. In addition, a molded article including the first metal layer-resin composite particle (B) shows very excellent luminance, and the first metal layer-resin composite particle (B) shows excellent polydispersity in the molded article.

The first thermosetting resin coating layer may have a refractive index ranging from 1.45 to 1.55. Herein, a molded article including this first metal layer-resin composite particle (B) shows an excellent metal-like texture and very excellent luminance. In particular, when the first thermosetting resin coating layer and the thermoplastic resin have similar refractive indexes, the molded article realizes a metal-like texture near to that of a painted one while not being painted, has no flow mark or weld line, and has excellent luminance.

The first thermosetting resin coating layer may have a thickness ranging from 0.5 to 10 μm. Specifically, the thickness may be in a range of 0.5 to 9 μm, 0.5 to 8 μm, 0.5 to 7 μm, 0.5 to 6 μm, 0.5 to 5 μm, 1 to 10 μm, 2 to 10 μm, 3 to 10 μm, and 4 to 10 μm.

When the first thermosetting resin coating layer has a thickness within the range, the first metal layer-resin composite particle (B) may show very excellent flatness. The molded article including the first metal layer-resin composite particle (B) realize a metal-like texture near to that of a painted one while not being painted, has excellent luminance, and has no flow mark or weld line.

The first thermosetting resin coating layer may be transparent or translucent. The first thermosetting resin coating layer may be the plural layers. In other words, the first thermosetting resin coating layer may have the same or a different haze, and the haze may be independently within a range of 0.5 to 40%. Specifically, the haze may be in a range of 0.5% to 40%, 0.5% to 35%, 0.5% to 30%, 0.5% to 25%, 0.5% to 20%, and 0.5% to 15%.

When the first thermosetting resin coating layer is transparent or translucent, that is, has a haze within the range, the first metal layer-resin composite particle (B) may realize high luminance and an excellent metal-like texture. The molded article including the first metal layer-resin composite particle (B) realize a metal-like texture near to that of a painted one while not being painted, and has excellent luminance.

The first metal layer-resin composite particle (B) may have a multi-layer structure.

The first metal layer-resin composite particle (B) may have a sandwich laminate structure.

The first metal layer-resin composite particle (B) may have a multi-layer structure including greater than or equal to three layers.

The first metal layer-resin composite particle (B) may further include a first thermoplastic resin coating layer at one outside or both outsides of the first thermosetting resin coating layer.

When the first thermoplastic resin layer is further included, it may make the thickness of the first thermosetting resin coating layer more uniform and further increase the flatness of the first metal layer, and thus, the first metal layer-resin composite particle (B) may show a very excellent flatness.

The first thermoplastic resin layer may include a polycarbonate resin, a rubber modified vinyl-based copolymer resin, a polyester resin, a polyalkyl(meth)acrylate resin, a styrene-based polymer, a polyolefin resin, or a combination thereof.

The first metal layer-resin composite particle (B) may have a thickness ranging from 1.0 to 100 μm. Specifically, the thickness may be in a range of 1.0 to 10 μm, 1.1 to 10 μm, 1.2 to 10 μm, 1.3 to 10 μm, 1.4 to 10 μm, and 1.5 to 10 μm. When the first metal layer-resin composite particle (B) has a thickness within the range, the first metal layer-resin composite particle (B) may realize high luminance and an excellent metal-like texture. The molded article including the first metal layer-resin composite particle (B) realize a metal-like texture near to that of a painted one while not being painted, has excellent luminance, and has no flow mark or weld line.

The first metal layer-resin composite particle (B) may have an average particle diameter ranging from 30 to 200 μm. Specifically, the average particle diameter may be in a range of 30 to 150 μm, 30 to 100 μm, and 50 to 200 μm.

When the first metal layer-resin composite particle (B) has an average particle diameter within the range, the first metal layer-resin composite particle (B) may realize high luminance and an excellent metal-like texture. The molded article including the first metal layer-resin composite particle (B) realize a metal-like texture near to that of a painted one while not being painted, and has excellent luminance.

In addition, when the first metal layer-resin composite particle (B) has an average particle diameter within the range, the first metal layer-resin composite particle (B) may be uniformly dispersed inside a molded article and thus, improve the metal-like texture and luminance of the molded article and suppress generation of a flow mark and a weld line thereon.

In the present invention, the average particle diameter and the thickness of the first metal layer-resin composite particle (B) are respectively obtained by sampling a part of the molded article and measuring particle diameters and thicknesses of greater than or equal to about 50 particles and calculating arithmetic means of the particle diameter and thickness measurements of the rest of the particles except for top 10% and bottom 10% of the particles based on the SEM image through an analysis of the cross section of the molded article based on a scanning electron microscope (SEM, S4800, Hitachi Inc.).

The first metal layer-resin composite particle (B) may be used in an amount ranging from 0.01 to 1 part by weight based on 100 parts by weight of the thermoplastic resin. Specifically, the first metal layer-resin composite particle (B) may be used in a range of 0.01 to 0.9 parts by weight, 0.01 to 0.8 parts by weight, 0.01 to 0.7 parts by weight, 0.01 to 0.6 parts by weight, 0.01 to 0.5 parts by weight, 0.1 to 1 part by weight, 0.1 to 0.9 parts by weight, 0.1 to 0.8 parts by weight, 0.1 to 0.7 parts by weight, 0.1 to 0.6 parts by weight, and 0.1 to 0.5 parts by weight.

When the first metal layer-resin composite particle (B) is used within the range, a molded article including the first metal layer-resin composite particle (B) shows a metal-like texture near to that of a painted one without being painted and has excellent luminance.

The first metal layer-resin composite particle (B) may be uniformly dispersed in the molded article. In general, since a metal particle has higher density than that of a thermoplastic resin, the metal particle is intensively dispersed in a center layer with a reference of the cross section of the molded article when a resin composition including the metal particle is injection-molded into a molded article. Accordingly, as for a molded article manufactured by using the conventional resin composition prepared by adding the metal particle to the thermoplastic resin, the metal particle is intensively dispersed in the center layer of the molded article. Herein, the molded article shows no excellent metal-like texture and luminance and has an appearance difference from a painted article. In addition, the molded article may have flow mark and weld line problems on the surface during the injection molding.

On the other hand, as for a molded article manufactured by using a resin composition including the first metal layer-resin composite particle (B) according to one embodiment of the present invention, the first metal layer-resin composite particle (B) is not dispersed only in the center layer but uniformly dispersed inside the molded article with a reference to the cross-section of the molded article. Accordingly, the molded article shows an excellent metal-like texture and luminance and almost similar appearance to that of a painted article and has no flow mark and weld line problems on the surface during the injection molding.

On the other hand, the first metal layer-resin composite particle (B) may be specifically manufactured by depositing a metal on one side of a first thermosetting resin coating layer to form a first metal layer and then, forming a first thermosetting resin coating layer on the outside of the first metal layer.

The first thermosetting resin coating layer may be formed in a common curing method such as thermal curing or UV curing after coating the thermosetting resin composition.

The method of depositing a metal may include a conventional deposition method without a particular limit and specifically, sputtering, E-beam evaporation, thermal evaporation, laser molecular beam epitaxy (L-MBE), pulsed laser deposition (PLD), metal-organic chemical vapor deposition (MOCVD), hydride vapor phase epitaxy (HVPE), and the like.

Another method of manufacturing the first metal layer-resin composite particle (B) includes forming a first thermosetting resin coating layer on one side of a thermoplastic resin layer, depositing a metal to form a first metal layer and then, forming a first thermosetting resin coating layer on the outside of the first metal layer. The first metal layer-resin composite particle (B) may be manufactured by using one among the manufacturing methods or their combinations and also, applying them more than once.

(C) Second Metal Layer-Resin Composite Particle

A second metal layer-resin composite particle includes a second metal layer and a second thermosetting resin coating layer positioned at both sides of the second metal layer.

The second metal layer may be specifically a metal foil.

The second metal layer may have a thickness ranging from 1 μm to 60 μm and specifically, 30 μm to 50 μm.

The second metal layer-resin composite particle may have an incision surface cut by a laser. In other words, the second metal layer-resin composite particle (C) may be manufactured in a laser-cutting method. The laser-cutting method indicates a method of forming a V-shaped groove by using a laser beam with a short pulse. When the second metal layer-resin composite particle (C) is manufactured in the laser-cutting method, the second metal layer-resin composite particle (C) is precisely cut to have a uniform size and thus, shows a uniform particle size distribution. In other words, a particle having a uniform particle distribution may be obtained.

In general in an art to which the present invention belongs, as a metal particle added to a resin composition is non-uniform, an appearance problem such as a flow mark, a weld line and the like on the surface of a molded article becomes severe.

According to one embodiment of the present invention, a resin composition includes the second metal layer-resin composite particle (C) having a uniform particle distribution and thus, may cause almost no appearance problem such as a flow mark, a weld line and the like on the surface of a molded article.

In the present invention, distribution uniformity of the second metal layer-resin composite particle (C) may be expressed as D90/D10. The D10 indicates a particle size at 10% of a volume ratio in a cumulative size-distribution curve, while the D90 indicates a particle size at 90% of the volume ratio. As the ratio of the D90 relative to D10, that is, D90/D10 is closer to 1, the particle distribution is more uniform.

The second metal layer-resin composite particle (C) may have a ratio of D90 relative to D10, that is, D90/D10 in a range of 0.8 to 1.2 and specifically, 0.8 to 1.1 and 0.9 to 1.1. The reason is that the second metal layer-resin composite particle (C) is very uniformly distributed.

The second metal layer-resin composite particle (C) has a quadrangular film shape. In other words, the second metal layer-resin composite particle (C) may have a thin film shape or a flat hexagonal shape.

When the width of the side of the second metal layer-resin composite particle (C) is a, while its length is b, a ratio of a relative to b, that is, a/b may be in a range of 0.8 to 1.2. Specifically, the ratio may be in a range of 0.9 to 1.2 and specifically, 0.9 to 1.1.

The second metal layer-resin composite particle (C) may have an average particle diameter ranging from 30 to 100 µm. Specifically, the average particle diameter may be in a range of 30 to 90 µm, 30 to 80 µm, 30 to 70 µm, and 40 to 70 µm. When the second metal layer-resin composite particle (C) has an average particle diameter within the range, the second metal layer-resin composite particle (C) may realize high luminance and an excellent metal-like texture, and a molded article including this second metal layer-resin composite particle (C) shows almost no flow mark and weld line.

Herein, the particle diameter indicates a longer one between the width (a) and the length (b).

The second metal layer-resin composite particle (C) may have a thickness ranging from 10 to 90 µm. Specifically, the thickness may be in a range of 30 to 90 µm, 10 to 80 µm, and 10 to 70 µm. When the second metal layer-resin composite particle (C) has a thickness within the range, the second metal layer-resin composite particle (C) may realize high luminance and an excellent metal-like texture. The molded article including the second metal layer-resin composite particle (C) realize a metal-like texture near to that of a painted one while not being painted, has excellent luminance, and has no flow mark or weld line.

In the present invention, the average particle diameter and the thickness of the second metal layer-resin composite particle (C) are respectively obtained by sampling a part of the molded article and measuring particle diameters and thicknesses of greater than or equal to about 50 particles and calculating arithmetic means of the particle diameter and thickness measurements of the rest of the particles except for top 10% and bottom 10% of the particles based on the SEM image through an analysis of the cross section of the molded article based on a scanning electron microscope (SEM, S4800, Hitachi Inc.).

In the second metal layer-resin composite particle (C), the second metal layer may be an aluminum foil. Herein, an excellent metal-like texture may be obtained, and the metal-like texture may be similar to silver gloss.

The second metal layer-resin composite particle (C) includes the second thermosetting resin coating layer and thus, may be uniformly dispersed inside a molded article.

The second thermosetting resin coating layer may be the same as or different from the above first thermosetting resin coating layer. When the second metal layer-resin composite particle (C) is fused/kneaded with the thermoplastic resin at a high process temperature, the second thermosetting resin coating layer may be neither fused nor separated and causes no chemical reaction with the thermoplastic resin. Accordingly, the second metal layer-resin composite particle (C) may not be modified but maintain a shape and properties at the high process temperature.

The second thermosetting resin coating layer may include specifically a phenolic resin, an epoxy resin, an unsaturated polyester resin, a urethane resin, a urea resin, a melamine resin, an alkyd resin, a silicone resin, a vinylester resin, or a combination thereof.

The second thermosetting resin coating layer may further include an additive. The additive may be polyvinyl butyral (PVB). When the second thermosetting resin coating layer further include the additive, adherence of the second metal layer to the second thermosetting resin coating layer, transparency of the second thermosetting resin coating layer, and properties of the second metal layer-resin composite particle (C) such as luminance and the like may be improved. In addition, a molded article including this second metal layer-resin composite particle (C) shows very excellent luminance and excellent polydispersity of the second metal layer-resin composite particle (C).

The second thermosetting resin coating layer may have a refractive index ranging from 1.45 to 1.55. Accordingly, a molded article including this second metal layer-resin composite particle (C) shows an excellent metal-like texture and very excellent luminance. In particular, when the second thermosetting resin coating layer and the thermoplastic resin have a similar refractive index, the molded article realizes a metal-like texture near to that of a painted one while not being painted and excellent luminance.

The second thermosetting resin coating layer may have a thickness ranging from 0.5 to 10 µm. Specifically, the thickness may be in a range of 0.5 to 9 µm, 0.5 to 8 µm, 0.5 to 7 µm, 0.5 to 6 µm, 0.5 to 5 µm, 1 to 10 µm, 2 to 10 µm, 3 to 10 µm, and 4 to 10 µm.

When the second thermosetting resin coating layer has a thickness within the range, the second metal layer-resin composite particle (C) may show excellent flatness. The molded article including the second metal layer-resin composite particle (C) realize a metal-like texture near to that of a painted one while not being painted, has excellent luminance, and has no flow mark or weld line.

The second thermosetting resin coating layer may be transparent or translucent. In other words, the second thermosetting resin coating layer may have the same or different haze in a range of 0.5 to 40% independently. Specifically, the haze may be in a range of 0.5% to 40%, 0.5% to 35%, 0.5% to 30%, 0.5% to 25%, 0.5% to 20%, and 0.5% to 15%.

When the second thermosetting resin coating layer is transparent or translucent, that is, has a haze within the range, the second metal layer-resin composite particle (C)

may realize high luminance and an excellent metal-like texture. The molded article including the second metal layer-resin composite particle (C) realize a metal-like texture near to that of a painted one while not being painted, has no flow mark or weld line, and has excellent luminance.

The second metal layer-resin composite particle (C) may have a multi-layer structure.

The second metal layer-resin composite particle (C) may have a sandwich laminate structure.

The second metal layer-resin composite particle (C) may have the multi-layer structure including greater than or equal to three layers.

The second metal layer-resin composite particle (C) may be included in an amount of 0.005 parts by weight to 0.8 parts by weight based on 100 parts by weight of the thermoplastic resin. Specifically, the amount may be in a range of 0.005 parts by weight to 0.7 parts by weight, 0.005 parts by weight to 0.6 parts by weight, and 0.005 parts by weight to 0.5 parts by weight.

When the second metal layer-resin composite particle (C) is used within the range, a molded article including this second metal layer-resin composite particle (C) shows a metal-like texture near to that of a painted one while not being painted, has excellent luminance, and particularly, has almost no flow mark or weld line during the injection molding.

On the other hand, the second metal layer-resin composite particle (C) may be manufactured by depositing a second metal layer on one side of a second thermosetting resin coating layer and a second thermosetting resin coating layer on the outside of the second metal layer.

Other Additives

The resin composition may further include an additive of an antibacterial agent, a heat stabilizer, an antioxidant, a release agent, light stabilizer, a surfactant, a coupling agent, a plasticizer, an admixture, a colorant, stabilizer, a lubricant, an antistatic agent, a coloring aid, a flame-proofing agent, a weather-resistance agent, an ultraviolet (UV) absorber, an ultraviolet (UV) blocking agent, a nucleating agent, an adhesion aid, adhesive or a combination thereof.

The antioxidant may include a phenol, phosphite, thioether, or amine antioxidant and the release agent may include a fluorine-included polymer, silicon oil, a stearic metal salt, a montanic metal salt, a montanic ester wax, or a polyethylene wax.

The weather-resistance agent may include benzophenone-type or amine-type weather-resistance agents, and the colorant may include a dye or a pigment. The ultraviolet (UV) ray blocking agent may include titanium oxide ($TiO_2$) or carbon black. The nucleating agent may include talc or clay.

The additive may be included in a predetermined amount as long as it does not deteriorate the properties of the resin composition and may be included in an amount of less than or equal to 40 parts by weight, specifically 0.1 to 30 parts by weight based on 100 parts by weight of the thermoplastic resin.

The above resin composition may be prepared in a well-known method of preparing a resin composition. For example, components and other additives according to one embodiment may be simultaneously mixed, melt-extruded with an extruder, and manufactured into a pellet.

According to another embodiment of the present invention, a molded article using the resin composition is provided.

The molded article may be manufactured by various processes such as injection-molding, blow molding, extrusion molding, thermal molding, and the like. In particular, the molded article has almost no flow mark and weld line problem but a metal-like texture appearance and thus, may be applied to an exterior plastic product such as IT products, home appliances, interior/exterior auto parts, furniture, interior items, miscellaneous goods, and the like.

The molded article according to one embodiment of the present invention has excellent metal-like texture. In the present invention, the metal-like texture is evaluated using a flop index. The flop index may be calculated according to Equation 1.

$$\text{Flop Index} = \frac{2.69(L^*_{15°} - L^*_{110°})^{1.11}}{(L^*_{45°})^{0.85}} \quad \text{[Equation 1]}$$

In Equation 1, L* (x°) indicates luminance measured at x°. The flop index is obtained by measuring reflectivity change while an angle of reflection is revolved and by specifically, measuring luminance (L*) at each angle of reflection of 15°, 45° and 110° and then, calculating the measurements according to the Equation 1.

One surface having no metal-like texture has a flop index of 0, a metal has a flop index ranging from about 15 to about 17, a metal-like texture coating used for an automobile body paint has a flop index of about 11; and the metal-like texture sensed by eyes has a flop index of greater than or equal to about 6.5.

A flop index of the molded article according to one embodiment of the present invention may range from 8 to 16. Specifically, it may range from 9 to 16, 10 to 16, 11 to 16, 12 to 16, 13 to 16, or 14 to 16.

The molded article according to one embodiment of the present invention has an excellent metal particle texture. In the present invention, the metal particle texture uses sparkle intensity as an index. The sparkle intensity may be obtained according to the following Equation 2.

$$\Delta S_{total} = \sqrt{\frac{\Delta S^2_{15°} + \Delta S^2_{45°} + \Delta S^2_{75°} + \Delta G^2}{4}} \quad \text{[Equation 2]}$$

In Equation 2, ΔS (x°) indicates sparkle intensity measured at x°, and ΔG is diffusion of each ΔS (x°) and indicates graininess of metal particles. The sparkle intensity ($\Delta S_{total}$) of the molded article is calculated according to the Equation 2 after measuring each sparkle intensity at about 15°, 45°, and 75°.

The sparkle intensity calculated according to Equation 2 is obtained by combining the following factors.

[Four Factors]
Reflectivity of individual metal particle
Amounts of metal particle
Sizes of metal particle
④ Orientation of metal particle A sparkle intensity of the molded article according to one embodiment of the present invention may range from 10 to 18. The sparkle intensity may be specifically 11 to 18, 12 to 18, 10 to 17, or 10 to 16.

The molded article according to one embodiment of the present invention may have improved luminance.

In the present invention, the luminance as an index showing brightness such as metal gloss is measured using a gloss level at about 60° with an UGV-6P digital variable gloss meter (SUGA Inc.).

The luminance of the molded article according to one embodiment of the present invention may range from 80 to 99. The luminance may specifically range from 80 to 95, 85 to 99, or 85 to 95.

Hereinafter, the present invention is illustrated in more detail with reference to examples. These examples, however, are not in any sense to be interpreted as limiting the scope of the invention.

EXAMPLES

A resin composition was prepared as provided in the following Table 1.

TABLE 1

|  | unit | Example | | | Comparative Example | | |
|---|---|---|---|---|---|---|---|
|  |  | 1 | 2 | 3 | 1 | 2 | 3 |
| (a-1) styrene-based copolymer resin | wt % | 20 | 20 | 20 | 20 | 20 | 20 |
| (a-2) rubber modified vinyl-based copolymer resin | wt % | 50 | 50 | 50 | 50 | 50 | 50 |
| (a-3) polyalkyl-(meth)acrylate resin | wt % | 30 | 30 | 30 | 30 | 30 | 30 |
| (b) first metal layer-resin composite particle | parts by weight | 0.3 | 0.3 | 0.3 | 0.3 | — | — |
| (c) second metal layer-resin composite particle | parts by weight | 0.01 | 0.05 | 0.1 | — | 0.01 | 0.05 |

Each composition used in the Table 1 is illustrated as follows.

(a-1) The styrene-based copolymer resin: an acrylonitrile-butadiene-styrene-methylmethacrylate copolymer resin made by Cheil Industries Inc. (Korea).

(a-2) The rubber modified vinyl-based copolymer resin: a transparent acrylonitrile-styrene-methylmethacrylate copolymer resin having a refractive index of 1.52 and a haze of 1.7% when manufactured into a 3.2 mm-thick specimen and made by Cheil Industries Inc. (Korea).

(a-3) The polyalkyl(meth)acrylate resin: a transparent polymethylmethacrylate resin having a refractive index of 1.48 and a haze of 0.7% when manufactured into a 3.2 mm-thick specimen and made by Cheil Industries Inc. (Korea).

(b) The first metal layer-resin composite particle: a first metal layer-resin composite particle including an aluminum vacuum-deposition layer and a first thermosetting resin coating layer positioned at both sides of the aluminum vacuum-deposition layer, and herein, the first thermosetting resin coating layer include 70 wt % of a silicone resin and 30 wt % of polyvinyl butyral (PVB) and having a refractive index of 1.47, and the first metal layer-resin composite particle has an average particle diameter of about 100 μm and an average thickness of about 1.4 μm.

(c) The second metal layer-resin composite particle: a second metal layer-resin composite particle including an aluminum foil and a second thermosetting resin coating layer positioned at both sides of the aluminum foil, and herein, the second thermosetting resin coating layer includes 70 wt % of a silicone resin and 30 wt % of polyvinyl butyral (PVB) and having a refractive index of 1.47, and the second metal layer-resin composite particle has an average particle diameter of about 60 μm, an average thickness of about 30 μm, and D90/D10 of 1 and manufactured in a laser-cutting method.

Examples 1 to 3 and Comparative Examples 1 to 3

The aforementioned components were used to prepare each resin composition according to Examples 1 to 3 and Comparative Examples 1 to 3 to respectively have the compositions provided in Table 1.

The resin composition was extruded through a common twin-screw extruder at a temperature ranging from 180 to 240° C. and then, manufactured into a pellet.

The pellet was dried at 80° C. for 4 hours and injection-molded by using an injection molding machine having injection capability of 6 oz, setting a cylinder temperature at 220 to 250° C., a molding temperature at 100° C., and a molding cycle time for 30 seconds, and using a mold having two gates, so that a weld line might be formed on the surface of a molded article specimen (width×length×thickness=100 mm×150 mm×3 mm).

Experimental Example

The molded article specimen was measured in the following method, and the results are provided in the following Table 2.

TABLE 2

|  | Example | | | Comparative Example | | |
|---|---|---|---|---|---|---|
|  | 1 | 2 | 3 | 1 | 2 | 3 |
| metal-like texture (Flop index) | 14.5 | 14.1 | 14.3 | 13.7 | 7.6 | 7.5 |
| metal particle texture (Sparkle intensity) | 12.1 | 12.4 | 12.3 | 11.5 | 5.9 | 5.7 |
| Luminance (Gloss level, 60°) | 88 | 90 | 89 | 84 | 78 | 76 |
| molded article appearance  flow mark | ○ | ○ | ○ | x | Δ | Δ |
| molded article appearance  weld line | ○ | ○ | ○ | x | Δ | Δ |

Experimental Example 1

Metal-Like Texture (Flop Index)

The present invention used a flop index to evaluate a metal-like texture. The flop index of the molded article according to the present invention was measured by using a BYK-Mac spectrophotometer made by BYK.

Referring to the Table 2, the molded articles according to Example 1 to 3 showed a remarkably high flop index compared with the ones according to Comparative Examples 2 and 3. The molded articles according to Example 1 to 3 showed an improved flop index compared with the one according to Comparative Example 1.

Experimental Example 2

Metal Particle Texture (Sparkle Intensity)

The present invention used sparkle intensity indicating a metal particle texture. The sparkle intensity of a molded article in the present invention was measured by using a MA98 multi-angle spectrophotometer made by X-Rite Inc.

Referring to the Table 2, the molded articles according to Examples 1 to 3 showed remarkably excellent sparkle intensity compared with the ones according to Comparative Examples 2 and 3 and also, much better sparkle intensity than that of the one according to Comparative Example 1.

Experimental Example 3

Luminance

The present invention used luminance as an index indicating brightness such as metal gloss and measured at 60° as a gloss level by using an UGV-6P digital variable gloss meter made by SUGA Inc.

Referring to the Table 2, the molded articles according to Examples 1 to 3 showed remarkably excellent luminance compared with the ones according to Comparative Examples 2 and 3 and also, much excellent luminance compared with the one according to Comparative Example 1.

Experimental Example 4

Appearance of Molded Article

The appearance of the molded articles according to one embodiment of the present invention and Comparative Example, that is, the generation degree of a flow mark and a weld line according to injection molding were examined with naked eyes.

When a poor color was less than 10% in the flow mark or the weld line, appearance was evaluated as '∘.'

When the poor color was greater than or equal to 10% and less than 50%, the appearance was evaluated as an average, 'Δ'

When the poor color was greater than or equal to 10% and less than or equal to 100%, the appearance was evaluated as insufficient, '×.'

Referring to the Table 2, the molded articles according to Examples 1 to 3 showed almost no flow mark or weld line and thus, very excellent appearance characteristics compared with the ones according to Comparative Examples 1 to 3.

In particular, the appearance characteristics of the molded article specimens according to Example 1 and Comparative Example 1 were compared through the photographs provided in FIGS. 1 to 4.

Figure 1:
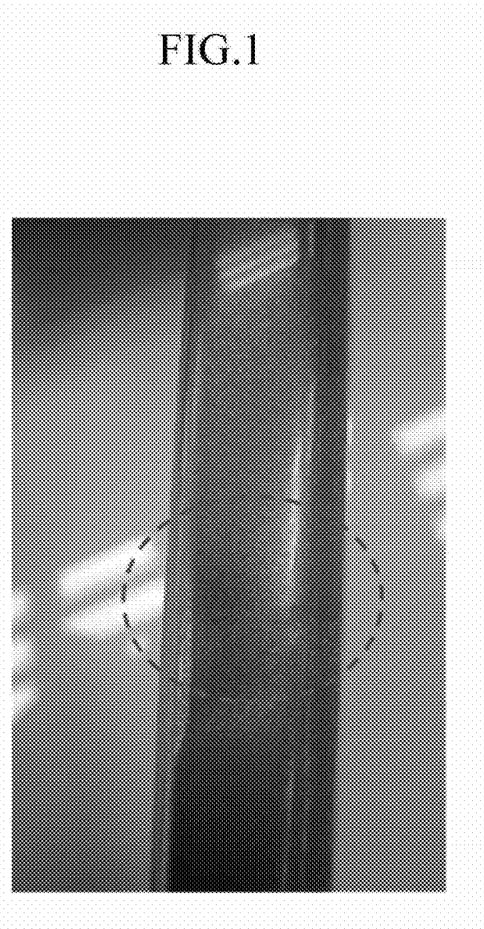
FIG. 1 is a photograph for evaluating the weld line of a molded article specimen according to Example 1.
Figure 2:
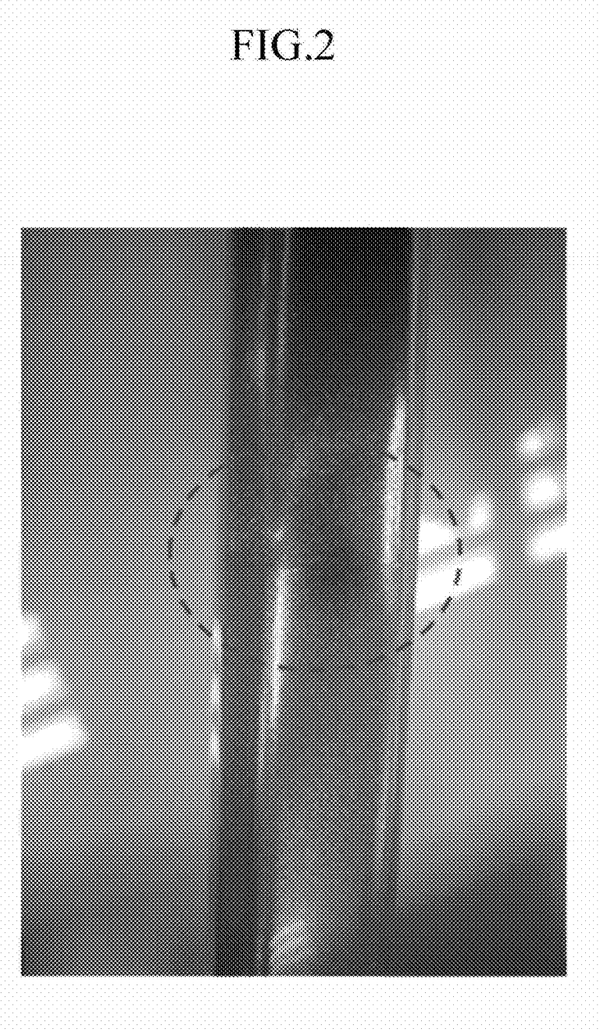
FIG. 2 is a photograph for evaluating the weld line of a molded article specimen according to Comparative Example 1.

FIG. 1 is a photograph evaluating the weld line of the molded article specimen according to Example 1, and FIG. 2 is a photograph evaluating the weld line of the molded article specimen according to Comparative Example 1. FIG. 2 clearly shows a poor color in the weld line, while FIG. 1 shows almost no poor color in the weld line.

Figure 3:
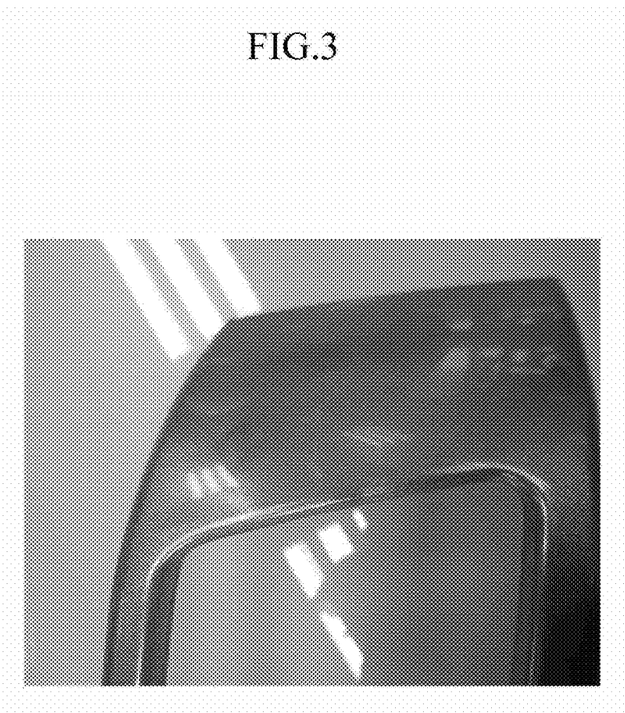
FIG. 3 is a photograph for evaluating the flow mark of the molded article specimen according to Example 1.
Figure 4:
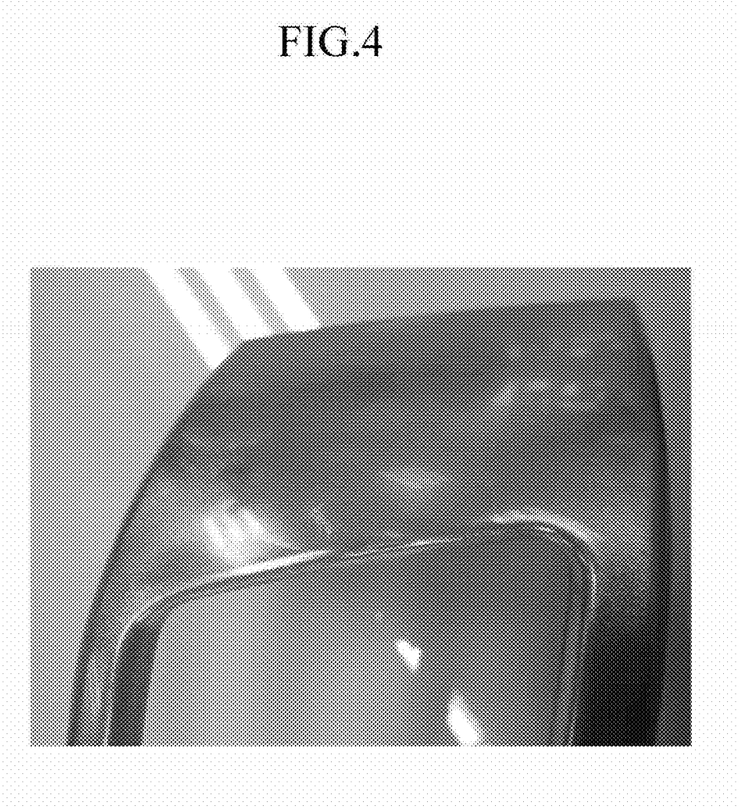
FIG. 4 is a photograph for evaluating the flow mark of the molded article specimen according to Comparative Example 1.

FIG. 3 is a photograph evaluating the flow mark of the molded article specimen according to Example 1, and FIG. 4 is a photograph evaluating the flow mark of the molded article specimen according to Comparative Example 1. In FIG. 4, a flow mark was observed, while in FIG. 3, no flow mark was observed.

Therefore, Comparative Example 1 showed remarkably insufficient appearance characteristics, and Comparative Examples 2 and 3 showed remarkably insufficient metal-like texture, metal particle texture and luminance. On the contrary, Examples 1 to 3 showed excellent metal-like texture, metal particle texture, luminance and simultaneously, improved appearance characteristics.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. A resin composition comprising
    (A) a thermoplastic resin,
    (B) a first metal layer-resin composite particle including a first metal layer and first thermosetting resin coating layers positioned on the first metal layer, wherein the first metal layer is a metal deposition layer, and
    (C) a second metal layer-resin composite particle including a second metal layer and second thermosetting resin coating layers positioned on the second metal layer,
    wherein at least one of the first metal layer-resin composite particle and the second metal layer-resin composite particle has a laminate structure.

2. The resin composition of claim 1, wherein a thickness of the first metal layer is 0.01 µm to 1.0 µm, and a thickness of the second metal layer is 1.0 µm to 60 µm.

3. The resin composition of claim 1, wherein a thickness of the first metal layer-resin composite particle (B) is 1.0 µm to 10 µm, and a thickness of the second metal layer-resin composite particle (C) is 10 µm to 90 µm.

4. The resin composition of claim 1, wherein the resin composition comprises
    (B) 0.01 part by weight to 1 part by weight of the first metal layer-resin composite particle and
    (C) 0.005 parts by weight to 0.8 parts by weight of the second metal layer-resin composite particle
    based on 100 parts by weight of the thermoplastic resin (A).

5. The resin composition of claim 1, wherein the thermoplastic resin (A) comprises a polycarbonate resin, a rubber modified vinyl-based copolymer resin, a polyester resin, a polyalkyl(meth)acrylate resin, a styrene-based polymer, a polyolefin resin, or a combination thereof.

6. The resin composition of claim 1, wherein the first metal layer is an aluminum deposition layer.

7. The resin composition of claim 1, wherein the second metal layer-resin composite particle (C) has a side cut by a laser.

8. The resin composition of claim 1, wherein the second metal layer-resin composite particle (C) has D90/D10 in a range of 0.8 to 1.2.

9. The resin composition of claim 1, wherein the second metal layer-resin composite particle (C) has a quadrangular film shape.

10. The resin composition of claim 1, wherein the second metal layer is an aluminum foil.

11. The resin composition of claim 1, wherein at least one of the first thermosetting resin coating layer and the second thermosetting resin coating layer is a phenolic resin, an epoxy resin, an unsaturated polyester resin, an urethane resin, an urea resin, a melamine resin, an alkyd resin, a silicone resin, a vinylester resin, or a combination thereof.

12. The resin composition of claim 1, wherein at least one of the thermoplastic resin, the first thermosetting resin coating layer and the second thermosetting resin coating layer has a refractive index of 1.45 to 1.55.

13. The resin composition of claim 1, wherein at least one of the thermoplastic resin, the first thermosetting resin coating layer and the second thermosetting resin coating layer is transparent or translucent.

14. The resin composition of claim 1, wherein at least one of the first metal layer-resin composite particle and the second metal layer-resin composite particle includes a metal layer, a first thermosetting resin coating layer positioned on one side of the metal layer, and a second thermosetting resin coating layer positioned on the other side of the metal layer to form a multi-layer laminate structure.

15. A molded article comprising the resin composition of claim 1.

16. The molded article of claim 15, wherein
a flop index of the molded article is 8 to 16,
a sparkle intensity of the molded article is 10 to 18, and
luminance of the molded article measured with reference to a gloss level at an angle of about 60° is 80 to 99.

* * * * *

UNITED STATES PATENT AND TRADEMARK OFFICE
CERTIFICATE OF CORRECTION

PATENT NO. : 9,637,630 B2
APPLICATION NO. : 14/769267
DATED : May 2, 2017
INVENTOR(S) : Seon-Ae Lee et al.

It is certified that error appears in the above-identified patent and that said Letters Patent is hereby corrected as shown below:

In the Specification

Column 14 delete Equation 1 and insert:

$$Flop\ Index = \frac{2.69(L^*_{15°} - L^*_{110°})^{1.11}}{(L^*_{45°})^{.086}}$$

Signed and Sealed this
First Day of August, 2017

Joseph Matal
*Performing the Functions and Duties of the*
*Under Secretary of Commerce for Intellectual Property and*
*Director of the United States Patent and Trademark Office*